United States Patent
Srivastava et al.

(10) Patent No.: US 10,069,569 B1
(45) Date of Patent: Sep. 4, 2018

(54) METHOD AND SYSTEM FOR IDENTIFYING CONNECTIVITY IN AN OPTICAL FIBER COMMUNICATION (OFC) NETWORK

(71) Applicant: WIPRO LIMITED, Bangalore (IN)

(72) Inventors: Swapnil Prakash Narayan Srivastava, Allahabad (IN); Ujwal Kapoor, Gurgaon (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/463,401

(22) Filed: Mar. 20, 2017

(30) Foreign Application Priority Data

Mar. 6, 2017 (IN) .............................. 201741007852

(51) Int. Cl.
*H04B 10/00* (2013.01)
*H04B 10/27* (2013.01)
*H04B 10/25* (2013.01)

(52) U.S. Cl.
CPC ............ *H04B 10/27* (2013.01); *H04B 10/25* (2013.01)

(58) Field of Classification Search
None
See application file for complete search history.

(56) References Cited

U.S. PATENT DOCUMENTS

| 5,394,503 A | 2/1995 | Dietz, Jr. et al. |
| 6,002,331 A | 12/1999 | Laor |
| 7,297,018 B2 | 11/2007 | Caveney et al. |
| 2010/0210135 A1* | 8/2010 | German ............... H04Q 1/138 439/491 |
| 2011/0008996 A1* | 1/2011 | Pinn .................... H04Q 1/136 439/489 |
| 2011/0043371 A1* | 2/2011 | German ............... H04Q 1/136 340/815.45 |

(Continued)

FOREIGN PATENT DOCUMENTS

DE 102007039294 4/2009

OTHER PUBLICATIONS

Extended European Search Report issued in the European Patent Office in counterpart European Application No. 17163926.3, dated Sep. 12, 2017, 9 pages.

*Primary Examiner* — Ken N Vanderpuye
*Assistant Examiner* — David Lambert
(74) *Attorney, Agent, or Firm* — Finnegan, Henderson, Farabow Garrett & Dunner LLP

(57) ABSTRACT

The present disclosure discloses a connectivity identification system for identifying connectivity in a OFC network (100) in a central office. The connectivity identification system comprises a transducer device (101) and an ultrasound communicator (107). When the transducer device (101) is connected to a first node (102), the ultrasound communicator (107) is configured to transmit an ultrasound signal modulated with a unique identifier, through an outer jacket of a Fiber Optic (FO) patch cord, connected between a transmitting port (105) of the first node (102) and a receiving port (106) of a second node (103). When the transducer device (101) is connected to the second node, the ultrasound communicator (107) is configured to receive the ultrasound signal from the transceiver unit (301), demodulate the ultrasound signal to retrieve the unique identifier and identify the receiving port (106) based on the demodulated unique identifier.

16 Claims, 4 Drawing Sheets

(56) References Cited

U.S. PATENT DOCUMENTS

2011/0304313 A1* 12/2011 Diab .................. H04Q 1/136
324/66
2012/0281509 A1* 11/2012 Liang .................. H04Q 1/136
367/197
2013/0138839 A1   5/2013 Abuelsaad et al.

* cited by examiner

METHOD AND SYSTEM FOR IDENTIFYING CONNECTIVITY IN AN OPTICAL FIBER COMMUNICATION (OFC) NETWORK

TECHNICAL FIELD

The present disclosure relates to the field of telecommunications. Particularly, but not exclusively, the present disclosure relates to a device for identifying connectivity in an Optical Fiber Communication (OFC) network.

BACKGROUND

A central office network comprises a plurality of nodes. A link between two or more nodes exist to enable communication between the nodes. In an Optical Fiber Communication (OFC) network within the central office, the link between the two or more nodes are enabled by a Fiber Optic (FO) patch cord. When a link is broken due to fault in a FO patch cord, the FO patch cord must be replaced. A technician has to replace the faulty FO patch cord by connecting a new FO patch cord to the nodes. Due to large number of FO patch cords, often the technician may not connect the new FO patch cord to the correct nodes. Also, the FO patch cords are placed in a tray placed at a first node. The tray may be placed below racks of the first node. Further, the FO patch cords are wired to the second node. Typically, the wiring is made by passing the FO patch cords underneath tiles of the central office. At the second node, the FO patch cords emerges and are placed on another tray, which may be placed below racks of the second node. Thus, the technician cannot identify connectivity of the FO patch cord between the first node and the second node. Also, the first node and the second node may be at different rooms and different floors of the central office. Hence, tracking the FO patch cords is a tedious task.

Traditional systems provide solutions to identify correct nodes for connecting the new FO patch cord. One such system comprises providing physical connections (wire) from one node to another node. Such systems result in additional hardware, making the telecommunication system more complex. Also, cost associated with providing physical connections to every node is very high. Other traditional systems involve installation of a transmitter at one node and a receiver at another node. Whenever, there is a fault in a node, the transmitter transmits a signal with various parameters related to the node, and a receiver at the other end receives the transmitted message. Thus, a technician can identify the correct node and can replace the FO patch cord. However, many of the central office is provided with a Radio Frequency (RF) shield to reduce electromagnetic noise affecting optical signals transmitted in the FO patch cord. The RF shield blocks the RF signals, and the traditional systems may not be able to transmit information to identify the correct node. Also, the installation of the transmitter and receiver involves high cost. Thus, the traditional systems do not provide an efficient and cost effective solution for identifying connectivity between nodes in the central office network.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a connectivity identification system for identifying connectivity in an Optical Fiber Communication (OFC) network (100) comprising a first node (102) and a second node (103). The connectivity identification system (100) comprises an ultrasound communicator (107) and a transducer device (101) communicatively connected to the ultrasound communicator (107). When the transducer device (101) is connected to the first node (102), the ultrasound communicator (107) is configured to transmit an ultrasound signal through the transducer device (101), modulated with a unique identifier, through an outer jacket of a Fiber Optic (FO) patch cord among a plurality of FO patch cords, connected between a transmitting port (105) of the first node (102) and a receiving port (106) of the second node (103). When the transducer device (101) is connected to the second node, the ultrasound communicator (107) is configured to receive the ultrasound signal from the transducer device (101), demodulate the ultrasound signal to retrieve the unique identifier and identify the receiving port (106) based on the demodulated unique identifier.

In an embodiment, the present disclosure relates to a method of identifying connectivity in an Optical Fiber Communication (OFC) network (100) comprising a first node (102) and a second node (103). The method comprises transmitting, by a connectivity identification system, an ultrasound signal modulated with a unique identifier, through an outer jacket of a Fiber Optic (FO) patch cord among a plurality of FO patch cords, connected between a transmitting port (105) of the first node (102) and a receiving port of the second node (103). The method further comprises receiving the ultrasound signal from an outer jacket of one of FO patch cord among the plurality of FO patch cords, connected to the second node (103), demodulating the ultrasound signal to retrieve the unique identifier and identifying the receiving port (106) based on the demodulated unique identifier.

In another embodiment, a non-transitory computer-readable medium storing computer-executable instructions for identifying connectivity in an Optical Fiber Communication (OFC) network (100) comprising a first node (102) and a second node (103), is disclosed. In one example, the stored instructions, when executed by a processor, cause the processor to transmit an ultrasound signal through the transducer device (101), modulated with a unique identifier, through an outer jacket of a Fiber Optic (FO) patch cord among a plurality of FO patch cords, connected between a transmitting port (105) of the first node (102) and a receiving port (106) of the second node (103). When the transducer device (101) is connected to the second node, the stored instructions, when executed by a processor, cause the processor to receive the ultrasound signal from the transducer device (101), demodulate the ultrasound signal to retrieve the unique identifier and identify the receiving port (106) based on the demodulated unique identifier.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
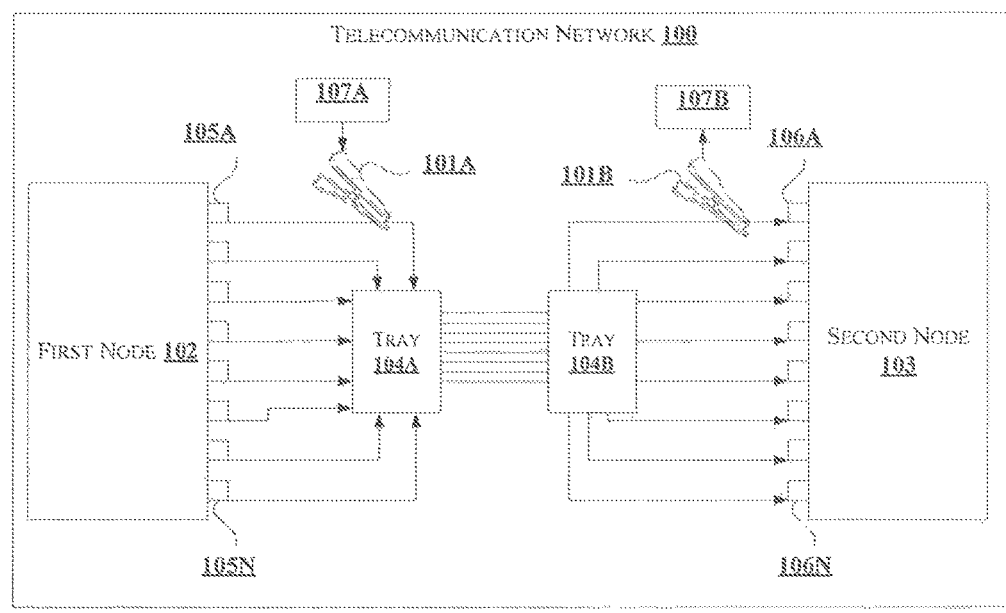
FIG. 1 shows an Optical Fiber Communication (OFC) network architecture for identifying connectivity between nodes in accordance with embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, random code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a connectivity identification system and a method for identifying connectivity between nodes in an Optical Fiber Communication (OFC) network in a central office. The connectivity identification system comprises an ultrasound transducer for transmitting and receiving ultrasound signals. The connectivity identification system further comprises an ultrasound communicator to configure the transducer device as a transmitter when the transducer device is connected to a first node of the OFC network and configure the transducer device as a receiver when the transducer device is connected to a second node of the OFC network. When configured as a transmitter, the transducer device transmits ultrasound signals through a Fiber Optic (FO) patch cord, and the transducer device or a similar transducer device receives the ultrasound signal when configured as a receiver. Further, the received ultrasound signal is used to identify connectivity between the first node and the second node.

FIG. 1 shows an Optical Fiber Communication (OFC) network 100 architecture in a central office, for identifying connectivity between nodes of the OFC network 100. The OFC network 100 comprises a transducer device 101A, a transducer device 101B, a first node 102, a second node 103, a first tray 104A, a second tray 104B, a transmitting port 105A, . . . , a transmitting port 105N, a receiving port 106A, . . . , a receiving port 106N, an ultrasound communicator 107A and an ultrasound communicator 107B. The transducer device 101A and a transducer device 101B may be represented together as a transducer device 101 in the present disclosure. In one embodiment, the first node 102 and the second node 103 may be an Optical Distribution Frame (ODF), a transmission rack or the like. In an embodiment, the OFC network 100 may be formed between a first ODF and a second ODF of the central office, a transmission rack and an ODF, or between any other entities of the central office. In an embodiment, the tray 104 is used for grouping the FO patch cords at the first node 102 and the second node 103. The FO patch cords are wired from the first tray 104A to the second tray 104B. In an embodiment, the FO patch cords may be wired beneath tiles of the central office. In an embodiment, the ultrasound communicator (107A) and the ultrasound communicator (107B) may be represented together as an ultrasound communicator (107). In an embodiment, the ultrasound communicator (107A) may be associated with the transducer device (101A). Likewise, the ultrasound communicator (107B) may be associated with the transducer device (101B). In an embodiment, the transmitting port 105A, . . . , the transmitting port 105N may be collectively represented as one or more transmitting ports 105. Likewise, the receiving port 106A, . . . , the receiving port 106N may be collectively represented as one or more receiving port 106 in the present disclosure. A FO patch cord is connected to each of the one or more transmitting port 105. At the second node, each of the FO patch cord is connected to corresponding receiving port 106. Further, the transducer device 101A is connected to a FO patch cord corresponding to a faulty port. The faulty port may be considered as the transmitting port 105, as the transducer device 101A is used to transmit ultrasound signals from faulty port end of the OFC network 100 to another end of the OFC network 100. In an embodiment, the transmitting port 105A may be considered as a faulty port. Likewise, ports on the other end of the OFC network 100 may be considered as receiving ports 106, as the ultrasound signal is received by the transducer device 101B at the other end of the OFC network 100. The transducer device 101A is clipped to the FO patch cord of the transmitting port 105. Further, the transducer device 101A transmits ultrasound signals through the FO patch cord. In an embodiment, the transducer device 101A is clipped to an outer jacket (not shown in figure) of the FO patch cord for transmitting the ultrasound signal. Alternatively, the ultrasound signals may be transmitted through a core or cladding of the FO patch cord. At the second node 103, the device 101B is clipped to a FO patch cord connected to a receiving port 106A. Likewise, the transducer device 101B may be connected to a FO patch cord connected to each of the one or more receiving ports 106 consecutively until the transducer device 101B receives the ultrasound signals transmitted by the transducer device 101A. When the transducer device 101B receives the ultrasound signals, from a FO patch cord, the transducer device 101B identifies a port connected to the FO patch cord as the receiving port 106A. Thus, connectivity between the one or more transmitting ports 105 and corresponding receiving port among the one or more receiving ports 105 is identified.

Figure 2:
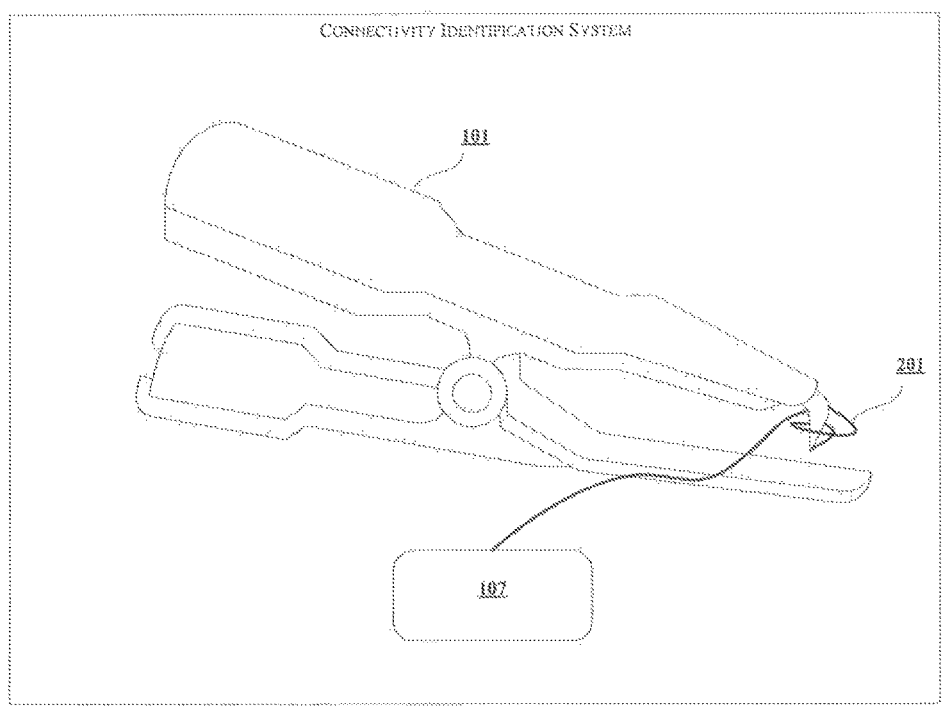
FIG. 2 shows an exemplary diagram of a connectivity identification system for identifying connectivity between nodes in a OFC network in accordance with embodiments of the present disclosure.

FIG. 2 shows an exemplary diagram of the connectivity identification system for identifying connectivity between nodes of the OFC network 100. The connectivity identification system comprises the transducer device 101 and the ultrasound communicator 107. The transducer device 101 represents a clip for clipping to the FO patch cord. The transducer device 101 comprises a probe 201. Further, the transducer device 101 may be associated with the ultrasound communicator 107. The transducer device 101 can be configured as an ultrasound transmitting device in one instance and as an ultrasound receiving device in another instance. When the transducer device 101 is configured as the transmitting device, the ultrasound communicator 107 is configured to generate electrical signals for transmitting corresponding ultrasound signals. When the transducer device 101 is configured as the receiving device, the ultrasound communicator 107 is configured to detect ultrasound signals and process the ultrasound signals to identify connectivity between nodes of the OFC network 100. In an embodiment, the probe 201 acts as an ultrasound injection probe when the transducer device 101 is configured as a transmitting device. The probe 201 acts as a detection probe when the transducer device is configured as a receiving device.

When the transducer device 101 is configured as an ultrasound transmitting device, the ultrasound communicator 107 generates electrical signals. Then, the electrical signals are provided to the probe 201, where the probe 201 is inserted in the outer jacket of the FO patch cord. The probe 201 acts as a transducer, which converts electrical signals into mechanical vibrations. The mechanical vibrations propagate through the outer jacket of the FO patch cord for identifying connectivity between nodes of the OFC network 100. In an embodiment, the mechanical vibrations are the ultrasound signals.

When the transducer device 101 is configured as an ultrasound receiving device, the ultrasound communicator 107 receives the electrical signals. Here, the transducer device 101 is connected to a FO patch cord, and the probe 201 is inserted into the outer jacket of the FO patch cord. The probe 201 acts as a transducer and receives mechanical vibrations from the FO patch cord. Further, the probe 201 converts the mechanical vibrations into electrical signals and provides the electrical signals to the ultrasound communicator 107. The ultrasound communicator 107 receives the electrical signals from the probe 201 and processes the electrical signals for identifying connectivity between nodes of the OFC network 100.

Figure 3:
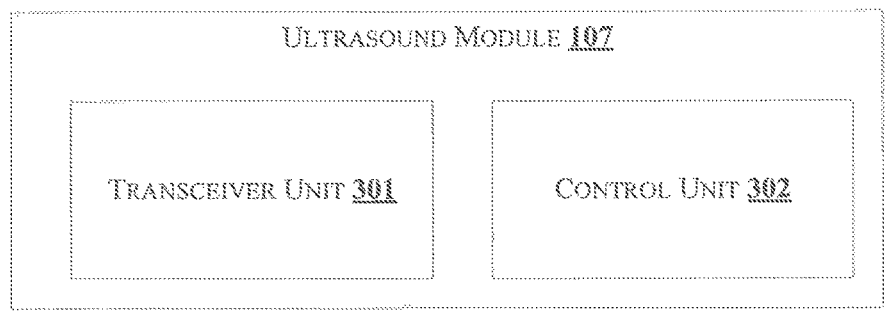
FIG. 3 shows an exemplary block diagram of an ultrasound communicator for identifying connectivity between nodes in a OFC network in accordance with embodiments of the present disclosure.

FIG. 3 shows a block diagram of an ultrasound communicator 107 for identifying connectivity between nodes in an OFC network 100. The ultrasound communicator 107 comprises a transceiver unit 301 and a control unit 302. The transceiver unit 301 can be configured to transmit electrical signals and receive electrical signals. The control unit 302 configures the transceiver to transmit electrical signals when the transducer device 101 is connected to the first node 102. Likewise, the control unit 302 configures the transceiver to receive electrical signals when the transducer device 101 is connected to the second node 103.

In an embodiment, the transceiver unit 301 may include, but is not limited to, a signal generator, a signal amplifier, an electrical transmitter, a signal conditioner, one or more band pass filters, a code detector and an ultrasound receiver. When the transceiver is configured as a transmitter, the signal generator, the signal amplifier, and the transmitter are activated. When the transceiver is configured as a receiver, the signal conditioner, the one or more band pass filters, the code detector and the signal receiver are activated.

The signal generator generates electrical signals of a predefined frequency and amplitude. The signal amplifier amplifies the electrical signal. Then, the transducer device 101 converts the electrical signals into mechanical vibrations and the mechanical vibrations are transmitted into the outer jacket of the FO patch cord.

The transducer device 101 is also used to convert ultrasound signals back to electrical signals. The signal conditioner processes the electrical signals converted by the transducer device 101. The one or more band pass filters are used to allow a predefined band of frequencies through the filter.

Figure 4:
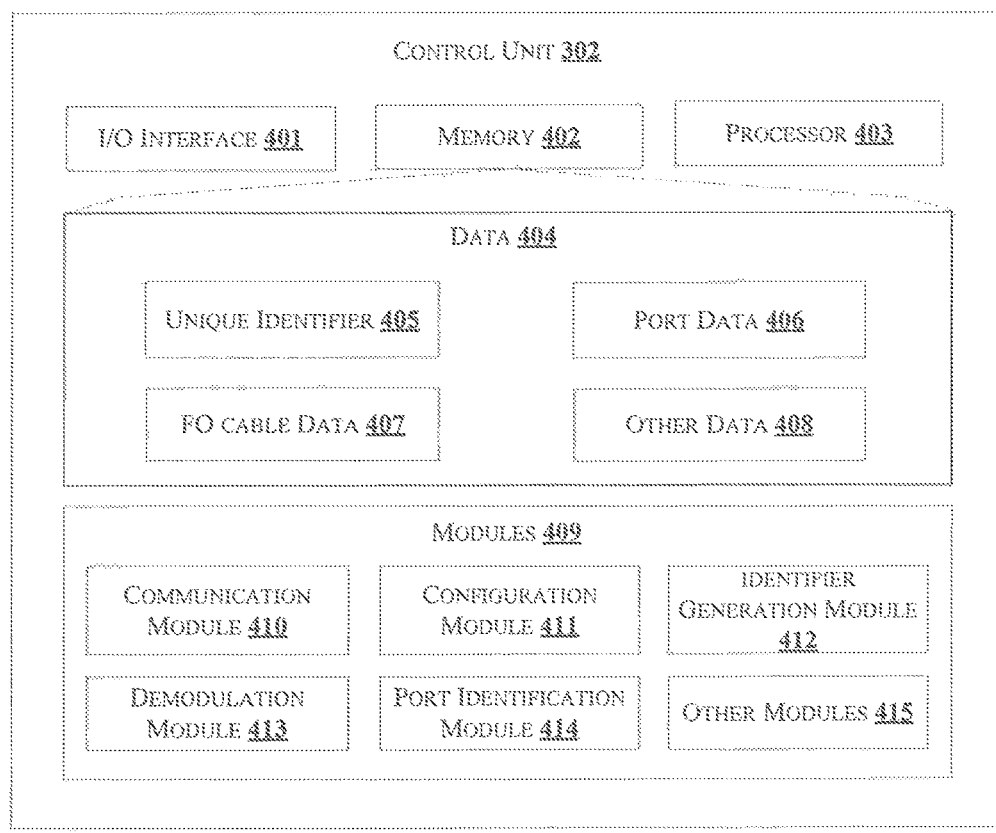
FIG. 4 shows an exemplary block diagram of an internal architecture of control unit for identifying connectivity between nodes in a OFC network in accordance with embodiments of the present disclosure.

FIG. 4 shows an exemplary block diagram of a control unit 302 illustrating internal architecture of the control unit 302 for identifying connectivity between nodes in a OFC network 100. The control unit 302 may include at least one Central Processing Unit ("CPU" or "processor") 403 and a memory 402 storing instructions executable by the at least one processor 403. The processor 403 may comprise at least one data processor for executing program components for executing user or system-generated requests. The memory 402 is communicatively coupled to the processor 403. The control unit 302 further comprises an Input/Output (I/O) interface 401. The I/O interface 401 is coupled with the processor 403 through which an input signal or/and an output signal is communicated.

In an embodiment, data 404 may be stored within the memory 402. The data 404 may include, for example, unique identifier 405, port data 406, FO patch cord data 407 and other data 408.

In an embodiment, the unique identifier 405 comprises a set of data which is unique to each of the FO patch cord connected between a transmitting port among the one or more transmitting ports 105 and a receiving port among the one or more receiving ports 106. The unique identifier 405 may be a set of randomly generated codes, random codes that may be present in a predefined list of codes, numeric data, alpha numeric data, or the like.

In an embodiment, the port data 406 may include, but are not limited to, number of ports, bit rate of port and bandwidth capacity of port.

In an embodiment, the FO patch cord data 407 may include, but are not limited to, channel capacity, channel gain, loss identifier in the FO patch cord, FO patch cord type, FO patch cord length, and FO patch cord number.

In an embodiment, the other data 408 may include, but are not limited to, OFC network 100 architecture type, type of encoding the unique identifier, and information of first node 102 and the second node 102.

In an embodiment, the data 404 in the memory 402 is processed by modules 409 of the control unit 302. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 409 when configured with the functionality defined in the present disclosure will result in a novel hardware.

In one implementation, the modules 409 may include, for example, a communication module 410, a configuration module 411, an identifier generation module 412, a demodulation module 413, a port identification module 414 and other modules 415. It will be appreciated that such aforementioned modules 409 may be represented as a single module or a combination of different modules.

In an embodiment, the communication module 410 may be used to communicate instructions to the transceiver unit 301. Further, the communication module 410 is configured to receive electrical signal from the transceiver unit 301. Also, the communication module 410 is configured to transmit the unique identifier to one or more devices similar to the device 100. Referring to FIG. 1, the transducer device 101A may be configured to transmit the ultrasound signals. The transducer device 101B may be configured to receive the ultrasound signals. Further, the first ultrasound communicator 107A transmits the unique identifier to the second ultrasound communicator 107B. The unique identifier may be transmitted over wired means or wireless means to a communication module 410 associated the one or more transducer devices.

In an embodiment, the configuration module 411 may configure the transducer device 100 either to transmit ultrasound signals or receive ultrasound signals. The configuration module 411 configures operation mode of the device 101 based on connection of the transducer device 101. Here, when the transducer device 101 is clipped to a FO patch cord connected to a port among the one or more transmitting port 105, the configuration module 411 configures the transducer device 100 to transmit ultrasound signals. When the transducer device 101 is clipped to a FO patch cord connected to a port among the one or more receiving ports 106, the configuration module 411 configures the transducer device 101 to receive ultrasound signals. In an embodiment, the configuration module 411 may configure the device 101 either to transmit or receive ultrasound signals upon receiving inputs from a user.

When the transducer device 101 is configured to transmit an ultrasound signal, the configuration module 411 instructs the transceiver to transmit ultrasound signals of a predefined frequency.

In an embodiment, the identifier generation module 412 may generate an identifier unique to each FO patch cord connected to the one or more transmitting ports (first node). The identifier may be a set of randomly generated codes, random codes that may be present in a predefined list of codes, numeric data, alpha numeric data, or the like. Further, the identifier generated may correspond to a predefined frequency. Thus, for a predefined frequency, a plurality of unique identifiers can be generated. The identifier generated for a device 101 configured in transmission mode is communicated by the communication module 410 to the device 100 configured in reception mode. Here, the communication module 410 modulates the identifier with the ultrasound signals and the modulated ultrasound signals are transmitted.

In an embodiment, the demodulation module 413 may receive electrical signals from a transceiver unit 301 of a transducer device 101 among the one or more devices configured to receive the ultrasound signals. Further, the demodulation module 413 demodulates the electrical signals to retrieve the identifier. The demodulation of the electrical signals is performed at an end of the OFC network 100 where the receiving port 106 has to be identified. Referring to FIG. 1, the demodulation of the electrical signals is performed at the second node 103.

In an embodiment, the port identification module 414 may receive the demodulated identifier from the demodulation module 413. Also, the port identification module 414 receives the identifier from a transducer device 101A (in one instance) configured to transmit ultrasound signals. The port identification module 414 compares the demodulated identifier with the identifier received from the transducer device 101A. When the demodulated identifier matches the identifier received from the transducer device 101B, the port identification module 414 identifies a port connected to the FO patch cord to which the transducer device 101B (in one instance) is connected, as the receiving port 106A (in one instance).

In an embodiment, the other modules 415 may include a notification unit. The notification unit may notify the user when the demodulated identifier matches the identifier received from the transducer device 101A. In an embodiment, the other modules may further include a user interface module. The user interface module may be used to receive information regarding length of the FO patch cord, obstacles in ultrasound signals transmission, transmission gain parameters, and the like.

Figure 5:
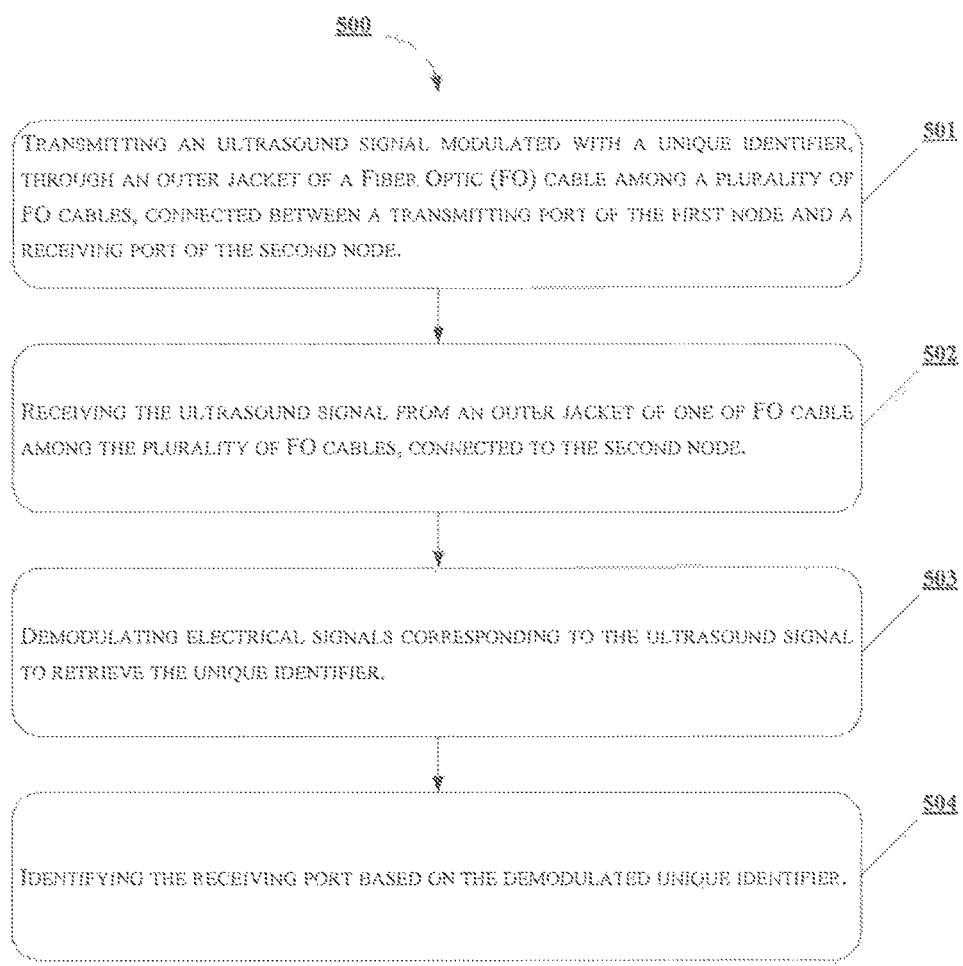
FIG. 5 shows a flow chart illustrating method steps for identifying connectivity between nodes in a OFC network in accordance with embodiments of the present disclosure.

FIG. 5 shows a flow chart illustrating a method for identifying connectivity between nodes in an OFC network 100, in accordance with some embodiments of the present disclosure.

As illustrated in FIG. 5, the method 500 may comprise one or more steps for identifying connectivity between nodes in a OFC network 100, in accordance with some embodiments of the present disclosure. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 501, transmitting an ultrasound signal modulated with a unique identifier through the outer jacket of the FO patch cord among a plurality of FO patch cords, by the first transducer device 101A.

At step 502, receiving the ultrasound signal from an outer jacket of one of FO patch cord among the plurality of FO patch cords, by the second transducer device 101B.

At step 503, demodulating electrical signals corresponding to the ultrasound signal received by the second transducer device 101B to retrieve the unique identifier, by the demodulation unit 413 of the second ultrasound communicator 107B.

At step 504, identifying the receiving port based on the demodulated unique identifier, by the port identification unit 414 of the second ultrasound communicator 107B.

The method steps 501 to 504 are illustrated in detail with an example below:

Referring to FIG. 1, consider a scenario where the transmitting port 105A is faulty. Thus, there is a need to replace a FO patch cord connecting the transmitting port 105A and a port among the one or more receiving port 106. Let a first transducer device 101A be clipped to the FO patch cord among a plurality of FO patch cords, connected to the transmitting port 105A. For illustration, let us consider that, at the first node 102, the FO patch cords are placed in the first tray 104A. Further, the FO patch cords are wired to the second node 103. Now the configuration module 410 of the first ultrasound communicator 107A configures the first transducer device 101A as a transmitting device, i.e., the first transducer device 101A is configured to transmit ultrasound signals. Further, the control unit 302 of the first ultrasound communicator 107A determines the port data and the FO patch cord data to determine characteristics for transmitting the ultrasound signals. The characteristics of the ultrasound signals may include, but are not limited to, frequency of the ultrasound signal, amplitude of the ultrasound signal, and phase of the ultrasound signal. Then, the control unit 302 generates a unique identifier for modulating the ultrasound signals with the unique identifier. Once the ultrasound signals are modulated with the unique identifier, the control unit 302 of the first ultrasound communicator 107A configures the first transducer device 101A to transmit the modulated ultrasound signals through the outer jacket of the FO patch cord.

Consider a second transducer device 101B at the second node 103 of the OFC network 100. The FO patch cords are collected by the second tray 104B associated with the second node 103. Here, the second device 101I is clipped to a FO patch cord corresponding to the receiving port 106A. Likewise, the second transducer device is clipped to each of the plurality of FO patch cords placed in the second tray 104B consequently, for identifying the receiving port 106. For illustration, let us consider that receiving port 106A corresponds to the transmitting port 105A. Now, the second ultrasound communicator 107B receives the unique identifier from the first ultrasound communicator 107A through an alternate communication channel. In an embodiment, the alternate channel may include wired or wireless means. Further, the second transducer device 101B receives the ultrasound signals from a FO patch cord among the plurality of FO patch cords. Then, the second ultrasound communicator 107B receives the electrical signals from the second transducer device 101B. The second ultrasound communicator 107B demodulates the electrical signals to retrieve the unique identifier. Further, the second ultrasound communicator 107B compares the demodulated unique identifier with the unique identifier received from the first ultrasound communicator 107A through the alternate channel. When the demodulated unique identifier matches the unique identifier received from the first ultrasound communicator 107A, the second ultrasound communicator 107B identifies a port connected to the FO patch cord. Further, the second ultrasound communicator 107B identifies the port as the receiving port 106A thereby identifying connectivity between the transmitting port 105A and the receiving port 106A.

In an embodiment, the ultrasound communicator 107 may comprise a user interface unit. The user interface unit may be used to receive inputs from the user. The inputs may include information on length of the FO patch cord, mode of operation of the device 101, FO patch cord data, port data, and OFC network architecture type. In an embodiment, the transducer device 101 may undergo a testing. During testing, the transducer device 101 may be configured to transmit predefined frequencies based on the length of the FO patch cord data 407. Further, the transducer device 100 may be subjected to calibration based on results obtained during testing of the device 100. In an embodiment, by using different frequencies and unique identifier for each frequency, a plurality of unique signals may be generated. In an embodiment, the transducer device 101 may receive instructions from the user to store data related to the calibration. The instructions may be in a specific format.

In an embodiment, the transducer device 101 may determine type of FO patch cord based on signal attenuation. Here, the transducer device 101 may transmit and receive a test signal through the FO patch cord. Then, the transducer device 101 may calculate signal attenuation by comparing power transmitted with power received. The transducer device 101 then determines type of FO patch cord by comparing the signal attenuation with a list of predetermined attenuation values corresponding to a FO patch cord among a plurality of FO patch cord.

In an embodiment, the first transducer device 101A acts as a transmitting device and the second transducer device 101B acts as a receiving device. Also, the first transducer device 101A may act as a receiving device and the second transducer device 101B may act as a transmitting device for determining connectivity between the ports of the first node 102 and the second node 103. Reversal of mode of operation of the first transducer device 101A and the second transducer device 101B may be performed for verification.

In an embodiment, nature of the transducer device 100 is different based on the port data 406 and the FO data 407. Thus, in an embodiment, the first transducer device 101A may comprise a transmitter only to transmit ultrasound signals and the second transducer device 101B may comprise a receiver only to receive the ultrasound signals.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a portable device for identifying connectivity between nodes of a OFC network. The device can be connected and removed, thus providing flexibility in operating the device.

In an embodiment, the device of the present disclosure transmits ultrasound signals to identify connectivity between nodes. The ultrasound signals do not interfere with optical signals. Thus, the proposed device utilizes existing architecture and thereby reduces cost and complexity.

In an embodiment, the device of the present disclosure may be clipped to a FO patch cord and can be removed easily. Thus, the device proves to adhere to space constraints requirements, unlike conventional systems which are permanently installed.

In an embodiment, the cost associated with the device is less as compared to traditional systems.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
|---|---|
| 100 | OFC network |
| 101 | Device |
| 102 | First node |
| 103 | Second node |
| 104 | Tray |
| 105 | Transmitting ports |
| 106 | Receiving ports |
| 107 | Ultrasound communicator |
| 201 | Probe |
| 301 | Transceiver unit |
| 302 | Control unit |
| 401 | I/O interface |
| 402 | Memory |
| 403 | Processor |
| 404 | Data |
| 405 | Unique identifier |
| 406 | Port data |
| 407 | FO patch cord data |
| 408 | Other data |
| 409 | Modules |
| 410 | Communication modules |
| 411 | Configuration module |
| 412 | Identifier generation module |
| 413 | Demodulation module |
| 414 | Port identification module |
| 415 | Other modules |

What is claimed is:

1. A connectivity identification system for identifying connectivity in an Optical Fiber Communication (OFC) network (100) comprising a first node (102) and a second node (103), the connectivity identification system comprising;
an ultrasound communicator (107);
and
a transducer device (101) communicatively connected to the ultrasound communicator (107),
wherein,
when the transducer device (101) is connected to the first node (102), the ultrasound communicator (107) is configured to:
generate a unique identifier based on one or more parameters of the transmitting port (105), one or more parameters of the receiving port (106) and one or more parameters of the FO patch cord;
transmit an ultrasound signal through the transducer device (101), modulated with the unique identifier, through an outer jacket of a Fiber Optic (FO) patch cord among a plurality of FO patch cords, connected between a transmitting port (105) of the first node (102) and a receiving port (106) of the second node (103), wherein a frequency of the ultrasound signal is selected from a set of predefined frequencies based on the length of the FO patch cord; and
transmit the unique identifier to the receiving port of the second node (103) via a wireless signal;
and wherein,
when the transducer device (101) is connected to the second node (103), the ultrasound communicator (107) is configured to:
receive the ultrasound signal from the transducer device (101), wherein the transducer device (101) receives the ultrasound signal from an outer jacket of one of FO patch cord among the plurality of FO patch cords;
receive the wireless signal from the transducer device (101), wherein the received wireless signal comprises the unique identifier;
demodulate the ultrasound signal to retrieve the unique identifier;
compare the unique identifier received via the wireless signal with the unique identifier retrieved by demodulation of the ultrasound signal; and
identify the connectivity in the OFC network (100) and the receiving port (106) based on the comparison, wherein the identification is based on a reversal of the mode of operation of the transducer device (101) connected to the first node (102) and the transducer device (101) connected to the second node (103).

2. The connectivity identification system of claim 1, wherein the ultrasound communicator (107) comprises a transceiver unit (301) and a control unit (302).

3. The connectivity identification system of claim 2, wherein the transceiver unit (301) comprises at least one of a signal generator, a signal amplifier, a transducer, an ultrasound transmitter, a signal conditioner, one or more band pass filters, a code detector and an ultrasound receiver.

4. The connectivity identification system of claim 1, wherein the unique identifier comprises at least one of random unique codes, and alphanumeric data.

5. The connectivity identification system of claim 1, wherein when the transducer device (101) is connected to the first node (102), the transducer device (101) transmits the unique identifier to a transducer device among one or more transducer devices, connected to the second node (103).

6. The connectivity identification system of claim 1, wherein the one or more parameters of the transmitting port and the one or more parameters of the receiving port comprises at least one of port number, bit rate of port and bandwidth capacity of port.

7. The connectivity identification system of claim 1, wherein the one or more parameters of the FO patch cord comprises at least one of channel capacity, channel gain, loss identifier in the FO patch cord, FO patch cord type, FO patch cord length, and FO patch cord number.

8. The connectivity identification system of claim 5, wherein the transducer device (101) connected to the first node (102) is a first transducer device (101A) and the transducer device among the one or more transducer devices connected to the second node (103) is a second transducer device (101B), wherein the first transducer device (101A) is associated with a first ultrasound communicator (107A) and the second transducer device (101B) is associated with a second ultrasound communicator (107B).

9. The connectivity identification system of claim 8, wherein the first transducer device (101A) is clipped to the FO patch cord to transmit the ultrasound signal, while the FO patch cord is connected to the transmitting port (105).

10. The connectivity identification system of claim 8, wherein the second transducer device (101B) is clipped to the FO patch cord, the outer jacket of which is used to receive the ultrasound signal, wherein the FO patch cord is connected to the receiving port (106).

11. A method of identifying connectivity in an Optical Fiber Communication (OFC) network (100) comprising a first node (102) and a second node (103), the method comprising:
generating, by a connectivity identification system, a unique identifier based on one or more parameters of the transmitting port (105), one or more parameters of the receiving port (106) and one or more parameters of the FO patch cord;
transmitting, by the connectivity identification system, an ultrasound signal modulated with the unique identifier, through an outer jacket of a Fiber Optic (FO) patch cord among a plurality of FO patch cords, connected between a transmitting port (105) of the first node (102) and a receiving port of the second node (103), wherein a frequency of the ultrasound signal is selected from a set of predefined frequencies based on the length of the FO patch cord;
transmitting, by the connectivity identification system, the unique identifier to the receiving port of the second node (103), via a wireless signal;
receiving, by the connectivity identification system, the ultrasound signal from an outer jacket of one of FO patch cord among the plurality of FO patch cords, connected to the second node (103), and the wireless signal from the transducer device (101), wherein the received wireless signal comprises the unique identifier;
demodulating, by the connectivity identification system, the ultrasound signal to retrieve the unique identifier; and
comparing, by the connectivity identification system, the unique identifier received via the wireless signal with the unique identifier retrieved by demodulation of the ultrasound signal; and
identifying, by the connectivity identification system, the connectivity in the OFC network (100) and the receiving port (106) based on the comparison, wherein the identification is based on a reversal of the mode of operation of the transducer device (101) connected to the first node (102) and the transducer device (101) connected to the second node (103).

12. The method of claim 11, wherein the unique identifier comprises at least one of random unique codes, and alphanumeric data.

13. The method of claim 11, wherein the one or more parameters of the transmitting port (105) and the one or more parameters of the receiving port (106) comprises at least one of port number, bit rate of port and bandwidth capacity of port, and wherein the one or more parameters of the FO patch cord comprises at least one of channel capacity, channel gain, loss identifier in the FO patch cord, FO patch cord type, FO patch cord length, and FO patch cord number.

14. The method of claim 11, wherein the step of transmitting is performed by a first transducer device (101A) associated with a first ultrasound communicator (107A), the steps of receiving are performed by a second transducer device (101B), the steps of demodulating and identifying is performed by a second ultrasound communicator (107B) associated with the second transducer device (101B).

15. The method of claim 14, further comprises transmitting by the first transducer device (101A), the unique identifier to one of a FO patch cord among the plurality of FO patch cords, and receiving by the second transducer device (101B), the unique identifier from the first transducer device (101A) for identifying the receiving port (106).

16. A non-transitory computer-readable medium storing instructions for identifying connectivity in an Optical Fiber Communication (OFC) network (100) comprising a first node (102) and a second node (103), wherein upon execution of the instructions by one or more processors, the processors perform operations comprising:
generating, by a connectivity identification system, a unique identifier based on one or more parameters of the transmitting port (105), one or more parameters of the receiving port (106) and one or more parameters of the FO patch cord;
transmitting an ultrasound signal modulated with the unique identifier, through an outer jacket of a Fiber Optic (FO) patch cord among a plurality of FO patch cords, connected between a transmitting port (105) of the first node (102) and a receiving port of the second node (103), wherein a frequency of the ultrasound signal is selected from a set of predefined frequencies based on the length of the FO patch cord;
transmitting, by the connectivity identification system, the unique identifier to the receiving port of the second node (103), via a wireless signal;
receiving the ultrasound signal from an outer jacket of one of FO patch cord among the plurality of FO patch cords, connected to the second node (103), and the wireless signal from the transducer device (101), wherein the received wireless signal comprises the unique identifier;
demodulating the ultrasound signal to retrieve the unique identifier;
comparing, by the connectivity identification system, the unique identifier received via the wireless signal with the unique identifier retrieved by demodulation of the ultrasound signal; and identifying the connectivity in the OFC network (100) and the receiving port (106) based on the comparison, wherein the identification is based on a reversal of the mode of operation of the transducer device (101) connected to the first node (102) and the transducer device (101) connected to the second node (103).

* * * * *